United States Patent
Press et al.

[11] Patent Number: 5,293,856
[45] Date of Patent: Mar. 15, 1994

[54] FUEL INJECTION

[75] Inventors: Roman J. Press, Rochester; Kenneth P. Cianfichi, Walworth, both of N.Y.

[73] Assignee: General Motors Corporation, Detroit, Mich.

[21] Appl. No.: 25,049

[22] Filed: Mar. 1, 1993

[51] Int. Cl.$^5$ .................. F02B 43/00; F02M 21/04; F02M 61/00

[52] U.S. Cl. .................. 123/472; 123/527; 239/585.1; 239/533.12; 181/229

[58] Field of Search .................. 239/533.12, 585.1; 181/229; 123/472, 527

[56] References Cited

U.S. PATENT DOCUMENTS

| | | | |
|---|---|---|---|
| 4,347,823 | 9/1982 | Kessler et al. | 123/472 |
| 4,572,436 | 2/1986 | Stettner et al. | 239/585 |
| 4,819,873 | 4/1989 | Lockwood, Jr. | 239/416.1 |
| 4,936,413 | 6/1990 | Lee | 181/229 |
| 4,953,789 | 9/1990 | Strobl et al. | 239/585.1 |
| 4,958,773 | 9/1990 | Stettner et al. | 239/584 |
| 4,958,774 | 9/1990 | Taylor | 239/584 |
| 4,969,536 | 11/1990 | Allen | 181/229 |
| 5,035,211 | 7/1991 | Mate et al. | 181/229 |
| 5,163,387 | 11/1992 | Lee | 181/229 |
| 5,196,653 | 3/1993 | Kiss | 181/229 |
| 5,201,299 | 4/1993 | Kong | 123/527 |
| 5,203,305 | 4/1993 | Porter et al. | 123/527 |
| 5,237,981 | 8/1993 | Polletta et al. | 123/527 |

Primary Examiner—E. Rollins Cross
Assistant Examiner—Erick Solis
Attorney, Agent, or Firm—Karl F. Barr, Jr.

[57] ABSTRACT

A gaseous fuel injection system has a fuel metering body having a tubular injector chamber with an expansion chamber at one closed end thereof; the expansion chamber having openings for the passage of fuel from the chamber to the exterior of the fuel metering body. Additionally, a spool type silencer is positioned between the expansion chamber and a fuel injector located at the end of the silencer opposite that of the expansion chamber. The silencer has a hollow cylindrical core with an inlet to receive fuel from the injector and a multiplicity of outlets for the passage of the fuel to an outer annular region. The outer annular region has an upper wall for support of the injector within the tubular injector chamber and a lower wall having openings for passage of the fuel from the annular region to the expansion chamber. The central core, the annular region and the expansion chamber cooperate to expand and silence compressed fuel as it moves from the outlet of the injector to the exterior of the fuel metering body.

1 Claim, 1 Drawing Sheet

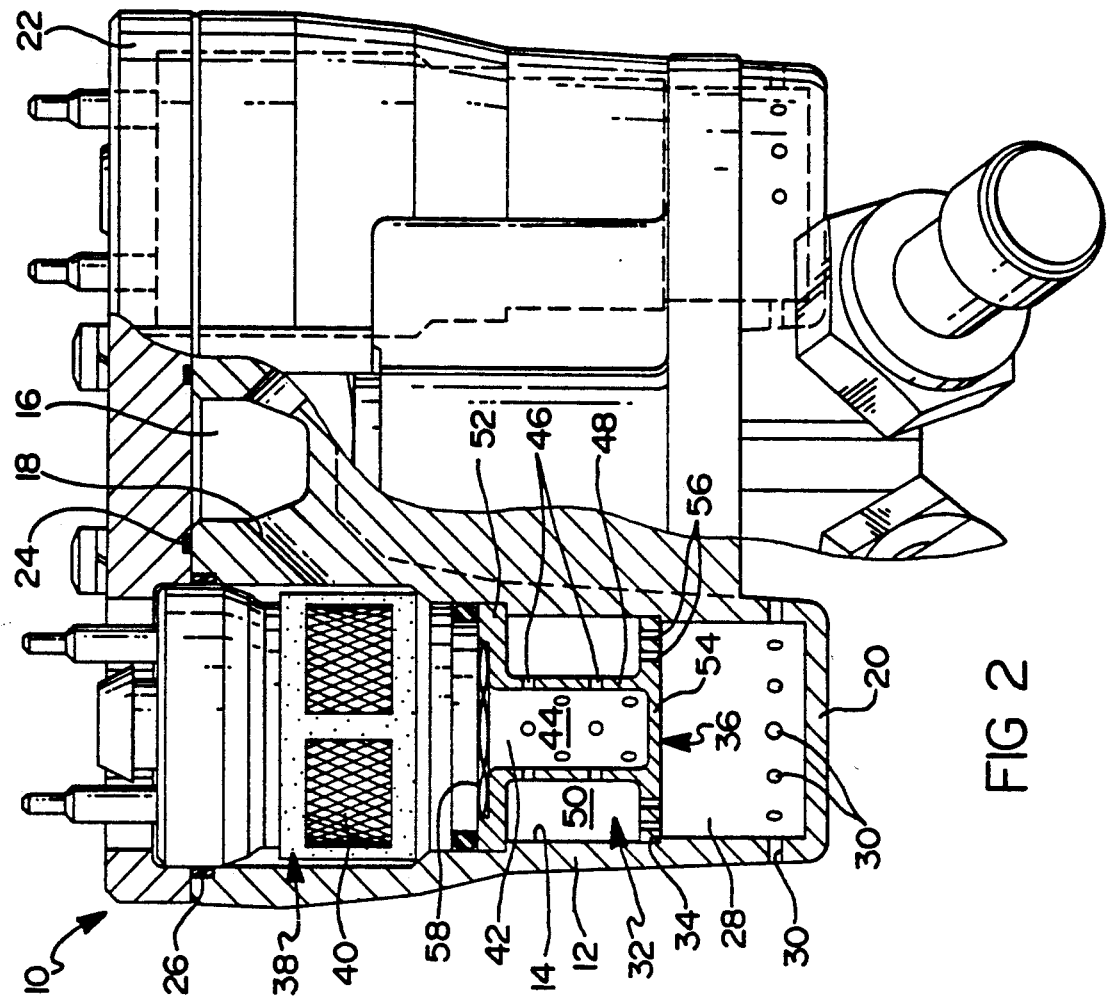
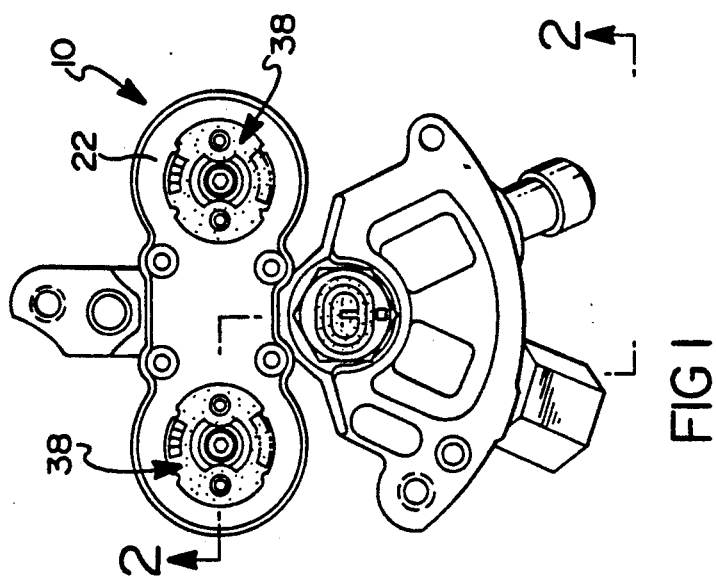

FUEL INJECTION

TECHNICAL FIELD

This invention relates to a fuel injection system for an internal combustion engine and, more particularly, to a fuel injection system for use with gaseous fuels having a need for high volume flow rates and low noise.

BACKGROUND

Electromagnetic fuel injectors are used in fuel injection systems for internal combustion engines because of the capability of this type of injector to effectively control the discharge of a precise metered quantity of fuel per unit time to an engine. In developing fuel injectors for use with gaseous fuels, such as compressed natural gas, the level of acoustic noise created by the high pressure gas discharging to atmospheric pressure may be objectionable. Use of sound attenuation means to control such noise is required.

BRIEF DESCRIPTION OF THE DRAWINGS

FIG. 1 is a plan view of a fuel metering body in accordance with the present invention; and FIG. 2 is a sectional view of the fuel metering body of FIG. 1 taken along line 2—2 of FIG. 1.

DESCRIPTION OF THE PREFERRED EMBODIMENT

Referring to FIGS. 1 and 2, a fuel metering body 10, for application to the intake system of an internal combustion engine, comprises a tubular injector chamber or pod 12 having a stepped inner wall 14 which communicates with a fuel chamber 16 through inlet passage 18. The fuel metering body 10, illustrated in the figure is of the dual-injector type. The number of injectors will be dependent upon the particular engine application. In the following description, only one injector, and associated hardware, is described. The tubular chamber of pod 12 is closed at one end by wall 20, and at a second end by a cover 22 having sealing means such as resilient members 24 and 26 disposed therebetween to prevent the leakage of fuel from within the fuel metering body 10.

Located adjacent to the closed end of the tubular chamber 12 is a fuel expansion chamber 28. The chamber 28 communicates with the exterior of the fuel meter body 10 through a number of openings 30 in inner wall 14. The openings 30 are preferably placed circumferentially about the lower end of the expansion chamber 28 although the openings may, in the alternative, be located in the end wall 20. A silencer chamber 32 resides adjacent to the expansion chamber 28, separated by shoulder 34 in pod inner wall 14 which is operable to support one end of a multistage spool-shaped baffle silencer 36 within silencer chamber 32.

Disposed adjacent a second end of the spool silencer 36, in tubular injector chamber 12, is an injector 38 having a body that receives fuel from inlet passage 18 in fuel metering body 10 through a plurality of radial inlet passages, not shown, surrounded by a filter 40. The injector is operable to meter a desired quantity of gaseous fuel therethrough in response to varying operator input.

Gaseous fuel exits the injector 38 and enters an inlet 42 in first stage 44 of the spool silencer 36. The first stage 44 comprises a hollow cylindrical center core having a multiplicity of openings 46 in the core wall 48 to facilitate the passage of the expanding gaseous fuel into a second stage 50 of the silencer which comprises an annular region extending about the outer circumference of the cylindrical center core of the first stage 44. The second stage has upper and lower walls 52, 54 respectively, with the upper wall operable to support the injector 38 within the tubular chamber 12 of the fuel meter body 10 and the lower wall 54 in engagement with shoulder 34 to support the silencer 36 within the tubular chamber 12 and having fuel passages 56 opening to the fuel expansion chamber 28. Biasing means such as spring washer 58 is disposed between the injector 38 and the upper wall 52 of silencer 36. The spring 58 biases the two members into firm abutment with the fuel metering body 10 and cover 22 so as to minimize vibration and resultant noise resulting from improper assembly tolerances. Passage of the compressed gaseous fuel from the outlet of the injector 38 through the first and second stages 44, 50 of spool silencer 36 and subsequently into expansion chamber 28 prior to exiting the fuel metering body 10 through openings 30 effectively reduces the acoustic noise created by the high pressure gaseous fuel discharging to atmospheric pressure.

The fuel injection system described may also employ the invention set forth in U.S. patent application Ser. No. 08/025,048 filed concurrently.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. A gaseous fuel injection system comprising a fuel metering body having a tubular injector chamber with a stepped inner wall, a first, closed end and a second, open end, and in communication with a fuel supply through a fuel inlet, said injection system further comprising a fuel expansion chamber located within and adjacent to said closed end of said tubular injector chamber and having a plurality of openings extending to the exterior of said fuel metering body, silencing means located within said tubular injector chamber and having a first end adjacent to said expansion chamber, and a fuel injector enclosed within said tubular injector chamber by a cover, said injector located adjacent to a second end of said silencing means and operable to meter fuel into said silencing means, said silencing means comprising a hollow cylindrical central core having a fuel inlet communicating with the outlet end of said injector and openings therein for passage of fuel to an outer annular region surrounding said core, said annular region having upper and lower walls, said upper wall operable to support said fuel injector within said tubular injector chamber and said lower wall having passages from said annular region surrounding said central core to said expansion chamber, wherein said central core, said annular region and said expansion chamber are in fluid communication and are operable to expand compressed gaseous fuel discharged from said injector and to limit acoustic noise created by the expansion prior to release of fuel from said expansion chamber through said plurality of openings.

* * * * *